(12) United States Patent
Martinovic

(10) Patent No.: US 7,862,087 B2
(45) Date of Patent: Jan. 4, 2011

(54) REUSABLE SAFETY APPARATUS FOR REDUCING THE FORWARD VELOCITY OF AN OCCUPANT OF A VEHICLE

(76) Inventor: Borislav Martinovic, 2301 Collins Ave., Apt. 533, Miami Beach, FL (US) 33139

( * ) Notice: Subject to any disclaimer, the term of this patent is extended or adjusted under 35 U.S.C. 154(b) by 168 days.

(21) Appl. No.: 12/196,972

(22) Filed: Aug. 22, 2008

(65) Prior Publication Data

US 2010/0045015 A1    Feb. 25, 2010

(51) Int. Cl.
*B60R 22/28* (2006.01)
(52) U.S. Cl. ..................................................... 280/805
(58) Field of Classification Search ................ 280/805, 280/806; 297/470, 480
See application file for complete search history.

(56) References Cited

U.S. PATENT DOCUMENTS

| | | | | |
|---|---|---|---|---|
| 2,880,815 A | * | 4/1959 | Apfelbaum | 180/270 |
| 3,343,874 A | * | 9/1967 | Hildebrandt | 297/470 |
| 3,484,134 A | * | 12/1969 | Townsend | 297/470 |
| 3,889,969 A | | 6/1975 | Otani | |
| 3,947,058 A | * | 3/1976 | Laporte | 297/470 |
| 4,072,348 A | * | 2/1978 | Auer | 297/470 |
| 5,516,199 A | * | 5/1996 | Crook et al. | 297/468 |
| 6,102,439 A | | 8/2000 | Smithson et al. | |
| 6,129,385 A | | 10/2000 | Blackadder | |

* cited by examiner

*Primary Examiner*—Paul N Dickson
*Assistant Examiner*—Robert A Coker
(74) *Attorney, Agent, or Firm*—Ruben Alcoba, Esq.; Craig S. Kirsch, Esq.

(57) ABSTRACT

A reusable safety apparatus for reducing the forward velocity of an occupant of a vehicle involved in a collision or another event that imparts forward velocity to the occupant of a vehicle comprising essentially of a casing member, a piston member substantially housed in the casing member, a piston resistance mechanism, and a piston release mechanism; the apparatus is fixedly attached in between a seatbelt anchor of a vehicle and the webbing material of a seatbelt.

12 Claims, 3 Drawing Sheets

REUSABLE SAFETY APPARATUS FOR REDUCING THE FORWARD VELOCITY OF AN OCCUPANT OF A VEHICLE

BACKGROUND

The present invention relates to occupant safety apparatuses, specifically apparatuses for reducing the forward velocity of an occupant of a vehicle involved in a collision or another event that imparts forward velocity to the occupant of a vehicle.

The inventor regularly drives on interstate highways and other public thoroughfares and has witnessed the tragic and devastating results of vehicular collisions. Such vehicular collisions occur hundreds of times each day and as a result an estimated 115 people are killed each day and countless others are seriously injured.

While returning home from work one day, the inventor witnessed a particularly severe accident and then began questioning the safety of his own vehicle. After researching the improvements that have been made in the automobile industry over the years, the inventor realized that the majority of advances were related to force absorbing crumple zones in the frames and chassis, anti-lock braking mechanisms and airbag related technologies.

It became apparent that the industry was geared toward these high tech solutions and did not focus on one of the most basic safety devices, the seatbelt. As such, seatbelt technology has not progressed or been given the same level of attention as other safety enhancing technologies.

After speaking with individuals who had survived automobile accidents of varying degrees of severity, the inventor quickly realized that many of the survivors had a common story, although they were not severely injured from their accidents they were either bruised or suffered from whiplash caused by their seat belt. The inventor realized that there must be a better way to design a seat belt apparatus that can reduce the collateral damage caused from a vehicular collision or another event that imparts forward velocity to an occupant of a vehicle.

In order to address this problem the inventor invented the present invention, specifically a reusable apparatus for reducing the forward velocity of an occupant of a vehicle. The present invention comprises essentially of a casing member, a piston member substantially housed in the casing member, a piston resistance mechanism and a piston release mechanism.

The present invention might be a standard feature for new automobiles or it might be an after-market addition to older model automobiles; in either situation one end of the hollow casing of the present invention is fixedly attached to a seatbelt anchor located on the interior frame of the vehicle and the exposed end of the piston member is fixedly attached to the seatbelt webbing material.

In normal operation, when the present invention is installed in between the seatbelt anchor and the seatbelt webbing material, the piston member is substantially housed in the casing member.

However, in the event the vehicle is involved in a collision or another event that imparts forward velocity on the occupant, the piston member slides about the longitudinal axis of the casing member at a rate determined by the resistance of the piston resistance mechanism.

After the piston member has slid about the longitudinal axis of the casing member, the occupant might return the piston to its position substantially housed in the casing member by activating the piston resistance release mechanism. Once the piston member is returned to its position substantially housed in the casing member, the apparatus may be used again.

An objective of the present invention, is to provide an apparatus that reduces the forward velocity of an occupant of a vehicle involved in a collision or another event that imparts forward velocity to the occupant of a vehicle.

Another objective of the present invention, is to provide a safety apparatus that may reduce the severity of injuries sustained by an occupant of a vehicle involved in a collision or another event that imparts forward velocity to the occupant of a vehicle.

Another objective of the present invention, is to provide a safety apparatus that may be installed in vehicles as an after-market feature.

Another objective of the present invention, is to provide a safety apparatus that is inexpensive to produce.

Yet a further objective of the present invention, is to provide a safety apparatus that may be reused multiple times.

Attempts to address these problems can be found in U.S. Pat. No. 6,129,385 (hereinafter the "385 patent"), U.S. Pat. No. 6,102,439 (hereinafter the "439 patent") and U.S. Pat. No. 3,889,969 (hereinafter the "969 patent"). However, each one of these references suffers from one or more of the following disadvantages. The references fail to address an apparatus that can be reused by the occupant and uses only mechanical means to provide resistance for the piston member.

For the foregoing reasons there exists a need for a reusable safety apparatus for reducing the forward velocity of an occupant of a vehicle involved in a collision or another event that imparts forward velocity to the occupant of a vehicle comprising essentially of a casing member, a piston member substantially housed in the casing member, a piston resistance mechanism and a piston resistance release mechanism.

SUMMARY

The present invention is a reusable safety apparatus for reducing the forward velocity of an occupant of a vehicle involved in a collision or another event that imparts forward velocity to the occupant of a vehicle comprising essentially of a casing member, a piston member substantially housed in the casing member, a piston resistance mechanism, and a piston resistance release mechanism.

In normal operation, when the present invention is installed in between the seatbelt anchor and the seatbelt webbing material, the piston member is substantially housed in the casing member. However, in the event the vehicle is involved in a collision or another event that imparts forward velocity on the occupant, the piston member slides about the longitudinal axis of the casing member at a rate determined by the resistance of the a piston resistance mechanism. After the piston member has slid about the longitudinal axis of the casing member, the occupant might return the piston to its position substantially housed in the casing member by activating the piston resistance release mechanism. Once the piston member is returned to its position substantially housed in the casing member, the apparatus may be used again.

DRAWINGS

These and other features, aspects, and advantages of the present invention will become better understood with regard to the following description, appended claims and drawings where:

DESCRIPTION

Figure 1:
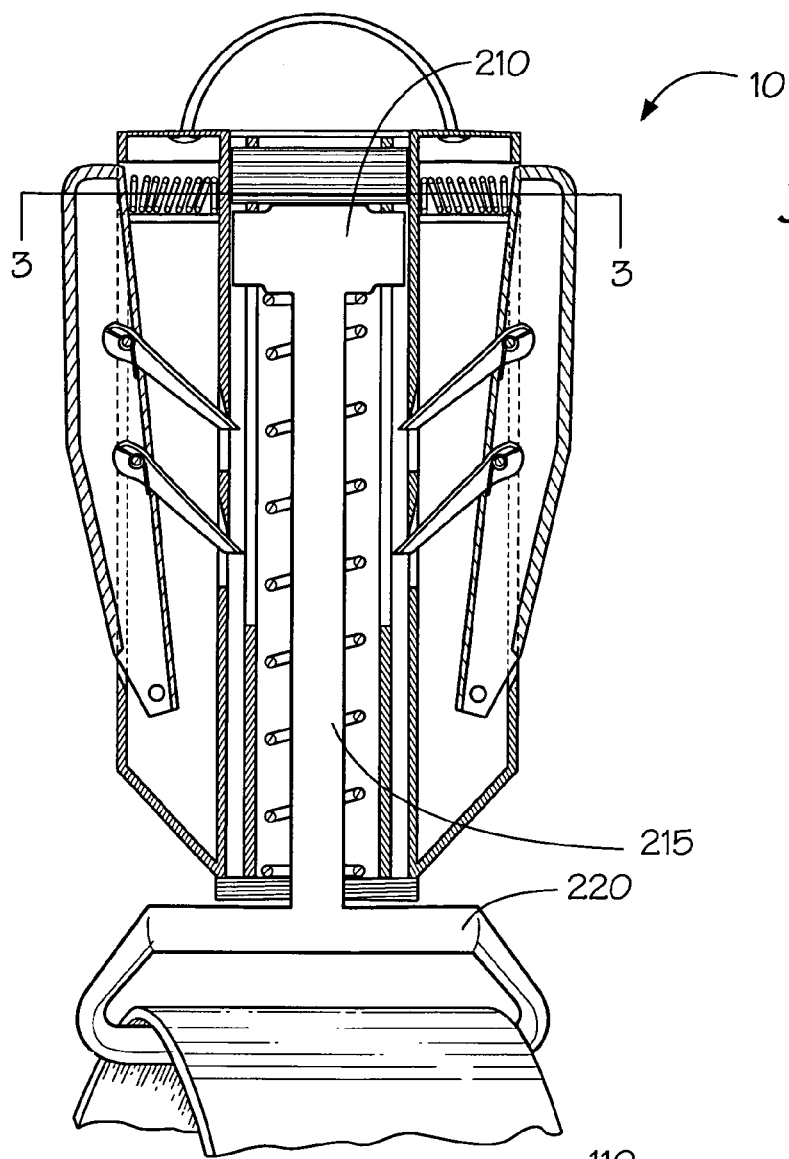
FIG. 1 shows a front plan view of one embodiment of the device in the compressed configuration.
Figure 3:
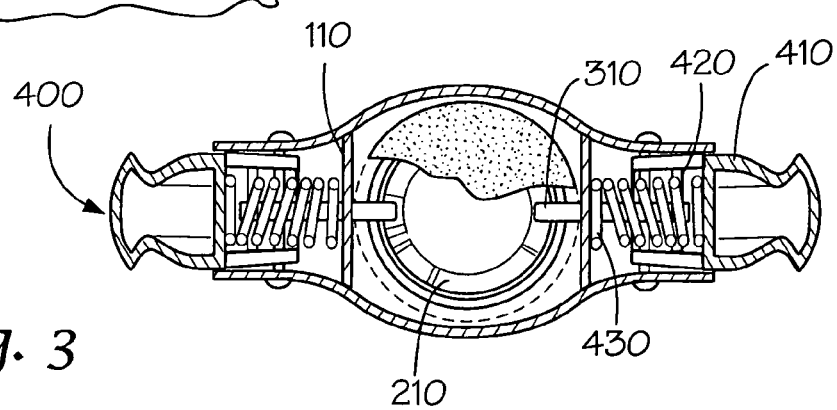
FIG. 3 shows a top plan view of one embodiment of the device.
Figure 2:
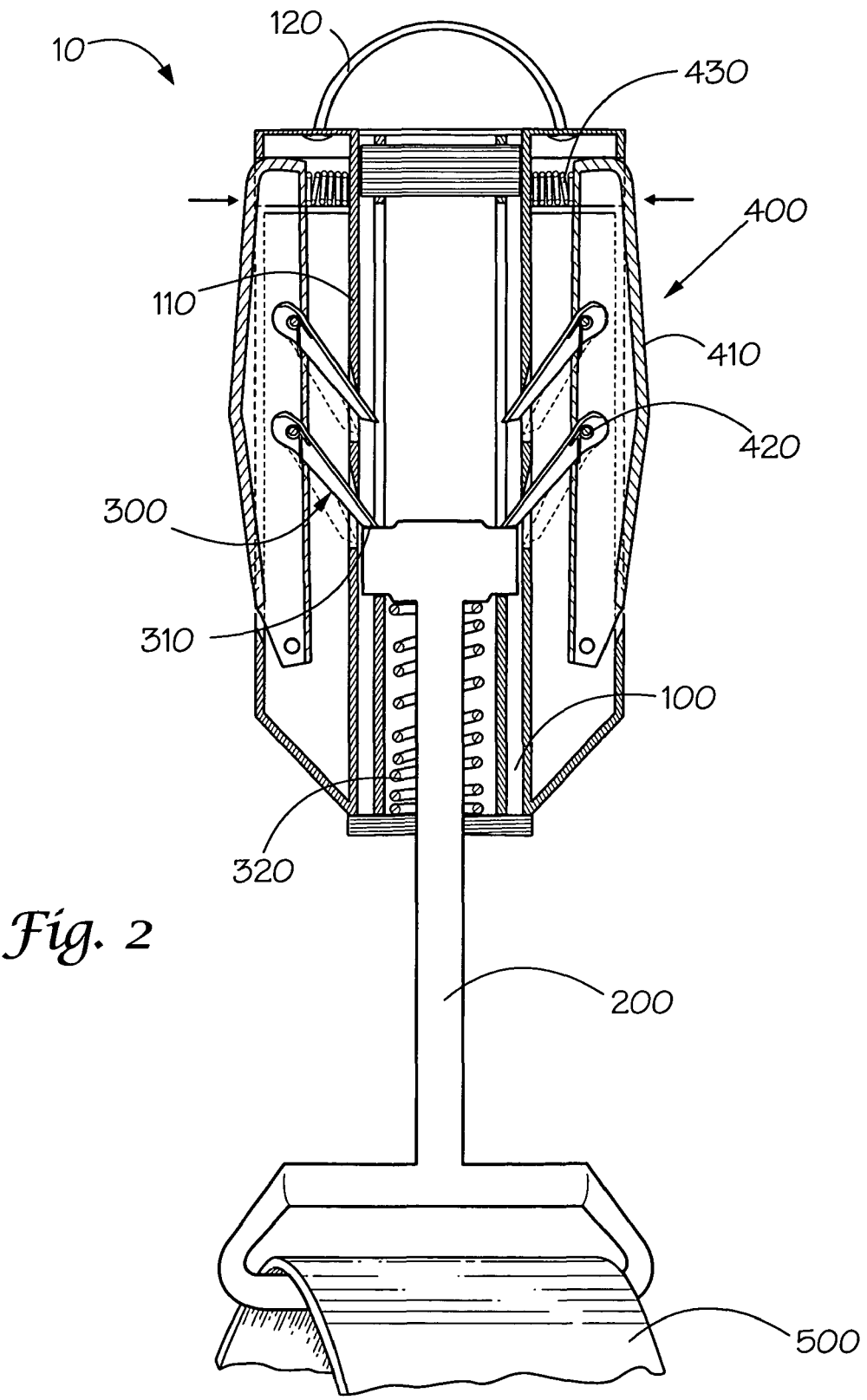
FIG. 2 shows a front plan view of one embodiment of the device in the extended configuration.
Figure 4:
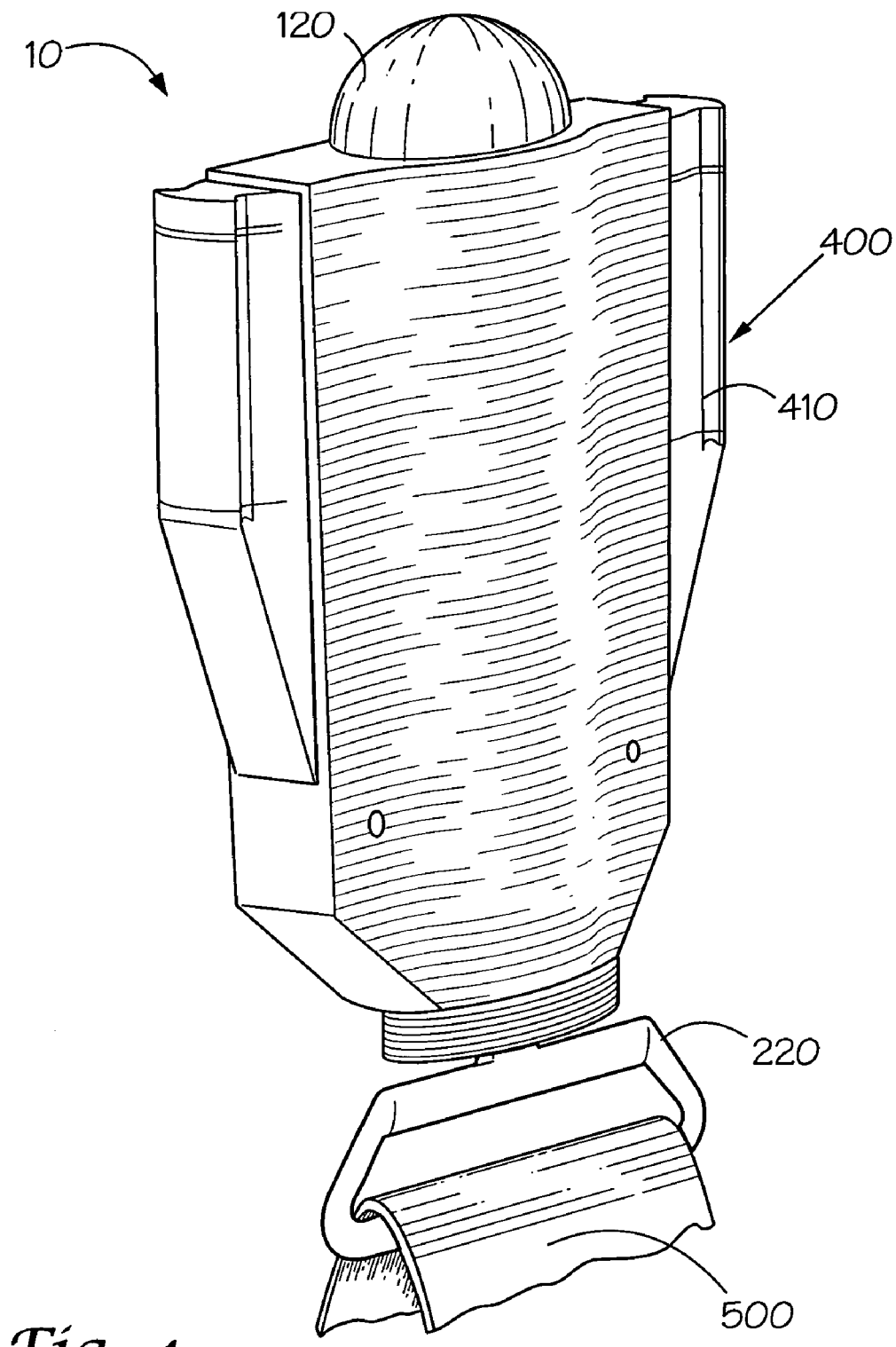
FIG. 4 shows a perspective view of one embodiment of the device.

As shown in FIGS. 1-4, an apparatus for reducing the forward velocity of an occupant of a vehicle, the apparatus 10 comprises a casing member 100 having a longitudinal axis, a piston member 200 housed in the casing member 100 in such a way that it can slide about the longitudinal axis of the casing member 100, a piston resistance mechanism 300 operatively connected to the piston member 200 and a piston resistance release mechanism 400 operatively connected to the piston resistance mechanism 300.

In one embodiment, the casing member 100 might be substantially cylindrical in shape, having a longitudinal axis, at least one bore 110 disposed about its longitudinal axis and a mounting bracket 120 fixedly attached to the casing member 100. The casing member 100 might be composed of a polycarbonate, alloy material or other material known in the art capable of withstanding the force generated by a vehicular collision. Regardless of its composition, the casing member 100 is substantially hollow and configured so that it can receive and slidably house the piston member 200.

The piston member 200 has a first end 210, a piston shaft 215, and a second end 220. The piston member 200 is slidably housed within the piston casing 100 so that when the apparatus 10 is in a compacted configuration (see FIG. 1), the first end 210 of the piston member 200 and the piston shaft 215 are housed within the casing member 100 and as the piston member 200 slides about the longitudinal axis of the casing member 100 and the apparatus 10 is moved to a subsequent extended configuration (see FIG. 2), the piston shaft 215 is exposed from within the casing member 100. The piston member 200 might be composed of a polycarbonate, alloy or other material known in the art capable of withstanding the force generated by a vehicular collision.

The piston resistance mechanism 300 comprises at least one tooth 310 and a spring 320 whereby the tooth 310 may be engaged with the bore 110 disposed on the casing member 100 and the piston member 200 thereby impeding the piston member 200 from sliding about the longitudinal axis of the casing member 100 and the spring 320 might be interposed between the piston member 200 and the casing member 100 in such a way as to further impede the piston member 200 from sliding about the longitudinal axis of the casing member 100. In one embodiment, there might be a plurality of teeth 310 arranged in such a manner that the second tooth provides more resistance than the first tooth, the third tooth provides more resistance than the second tooth, the fourth tooth provides more resistance than the third tooth, and so on.

The piston resistance release mechanism 400 comprises a least one arm member 410 and at least one hinge 420. In one embodiment, the piston resistance release mechanism 400, might further comprise at least one spring 430 operationally connected to the piston resistance release mechanism 400. When the piston resistance release mechanism 400 is activated, the tooth 310 is disengaged from the piston member 200, thereby allowing the piston member 200 to slide about the longitudinal axis of the casing member 100.

In normal use, the apparatus 10 is mounted in a vehicle (not shown) so that the mounting bracket 120 is fixedly attached to the seatbelt anchor (not shown) of the vehicle and the exposed second end 220 of the piston member 200 is fixedly attached to seatbelt webbing material 500 and the apparatus 10 is in a compacted configuration (See FIG. 1).

In the event the vehicle is involved in a collision or another event that imparts forward velocity on the occupant (the event), the piston member 200 slides about the longitudinal axis of the casing member 100 at a rate determined by the resistance of the piston resistance mechanism 300. Depending on the force generated by the event the apparatus 10 might move from the compacted configuration (See FIG. 1) to a subsequent extended configuration (See FIG. 2).

Once the piston member 200 has slid about the longitudinal axis of the casing member 100 and the apparatus 10 is in an extended configuration (See FIG. 2), the user might return the piston member 200 to its compacted position (See FIG. 1) by activating the piston resistance piston release mechanism 400. Once the piston member 200 is returned to its compacted position (See FIG. 1), the apparatus 10 may be used again.

An advantage of the present invention, is that it provides a safety apparatus that reduces the forward velocity of an occupant of a vehicle involved in a collision or another event that imparts forward velocity to the occupant of a vehicle.

Another advantage of the present invention, is that it provides a safety apparatus that may reduce the severity of injuries sustained by an occupant of a vehicle involved in a collision or another event that imparts forward velocity to the occupant of a vehicle Another advantage of the present invention, is that it provides a safety apparatus that may be installed in vehicles as an aftermarket feature.

Another advantage of the present invention, is that it provides a safety apparatus that is inexpensive to produce.

Yet a further advantage of the present invention, is that it provides a safety apparatus that may be reused multiple times.

Although the present invention has been described in considerable detail with reference to certain preferred versions thereof, other versions are possible. Therefore, the spirit and the scope of the claims should not be limited to the description of the preferred versions contained herein.

What is claimed is:

1. An apparatus for reducing the forward velocity of an occupant of a vehicle, the apparatus comprising;
   a casing member having a longitudinal axis, the casing member is substantially cylindrical in shape, and the casing member further comprises at least one bore disposed about its longitudinal axis;
   a piston member housed in the casing member in such a way that it can slide about the longitudinal axis of the casing member;
   a piston resistance mechanism comprising at least one tooth, at least one bore and at least one spring, the piston resistance mechanism is operatively connected to the piston member; and
   a piston release mechanism operatively connected to the piston resistance mechanism.

2. The apparatus of claim 1, wherein the piston resistance mechanism further comprises at least one tooth, the tooth may be engaged with the bore disposed on the casing member and the piston member, thereby impeding the piston member from sliding about the longitudinal axis of the casing member.

3. The apparatus of claim 2, wherein the piston resistance mechanism is arranged in such a manner that the second tooth provides more resistance than the first tooth, the third tooth provides more resistance than the second tooth, the fourth tooth provides more resistance than the third tooth, and so on.

4. The apparatus of claim 3, wherein the piston resistance mechanism further comprises a spring interposed between the piston member and the casing member in such a way as to impede the piston member from sliding about the longitudinal axis of the casing member.

5. The apparatus of claim 4, wherein the piston release mechanism further comprises at least one arm member.

6. The apparatus of claim 4, wherein the arm member further comprises at least one hinge.

7. The apparatus of claim 6, wherein the casing member is made of a polycarbon or alloy material capable of withstanding the force generated by a vehicular collision.

8. The apparatus of claim 7, wherein the piston member is made of a polycarbon or alloy material capable of withstanding the force generated by a vehicular collision.

9. An apparatus for reducing the forward velocity of an occupant of a vehicle, the apparatus comprising;
 a substantially cylindrical casing member having a longitudinal axis, the casing member further comprising at least one bore disposed about its longitudinal axis;
 a piston member housed in the casing member in such a way that it can slide about the longitudinal axis of the casing member;
 a piston resistance mechanism comprising at least one tooth, at least one bore and at least one spring whereby the piston resistance mechanism is operatively connected to the piston member and a tooth may be engaged with a bore disposed on the casing member and the piston member; and
 a piston release mechanism operatively connected to the piston resistance mechanism whereby the piston release mechanism comprises at least one arm member.

10. The apparatus of claim 9, wherein the member further comprises at least one hinge.

11. The apparatus of claim 10, wherein the casing member is made of a polycarbon or alloy material capable of withstanding the force generated by a vehicular collision.

12. The apparatus of claim 11, wherein the piston member is made of a polycarbon or alloy material capable of withstanding the force generated by a vehicular collision.

* * * * *